United States Patent [19]

Cardarelli et al.

[11] Patent Number: 4,979,796
[45] Date of Patent: Dec. 25, 1990

[54] THERMALLY CONTROLLED OPTICAL FIBER

[75] Inventors: Donato Cardarelli, Medfield; Frederick J. Petri, Littleton, both of Mass.

[73] Assignee: The Charles Stark Draper Laboratory, Inc., Cambridge, Mass.

[21] Appl. No.: 451,102

[22] Filed: Dec. 15, 1989

[51] Int. Cl.⁵ .............................. G02B 6/02; G02B 6/16
[52] U.S. Cl. .................................................. 350/96.29
[58] Field of Search .............. 350/96.29, 96.30, 96.33

[56] References Cited

U.S. PATENT DOCUMENTS

| | | | |
|---|---|---|---|
| 3,445,666 | 5/1969 | Snaper | 350/96.29 |
| 3,617,108 | 11/1971 | Fritsch et al. | 350/96.29 |
| 3,647,277 | 3/1972 | Kaminow | 350/96.29 |
| 4,095,101 | 6/1978 | Lemelson | 350/96.29 |
| 4,782,492 | 11/1988 | McMahon et al. | 350/96.29 |
| 4,883,337 | 11/1989 | Dahlgren | 350/96.29 |

Primary Examiner—John D. Lee
Assistant Examiner—Robert E. Wise
Attorney, Agent, or Firm—Lahive & Cockfield

[57] ABSTRACT

A temperature stable optical fiber includes an elongated, flexible optically transmissive core and associated circumferential cladding, and a heater for selectively heating said core and cladding. The heater includes a resistive film disposed about and in thermal contact with the outer surface of the cladding, whereby the temperatures of said core and cladding are controlled.

7 Claims, 2 Drawing Sheets

THERMALLY CONTROLLED OPTICAL FIBER

FIELD OF THE INVENTION

The invention relates to optical fibers and to instruments employing such optical fibers.

BACKGROUND AND OBJECTS OF THE INVENTION

Optical waveguides in the form of thin, flexible optically transmissive fibers with an external reflective surface cladding are well known as optical fibers. Optical fibers are typically used as transmission paths for optical signals and in various instruments. Inertial rate sensors are one important application of optical fibers. In such uses, optical fibers are reliable, compact, highly resistant to electromagnetic interference, and offer increased sensitivity, bandwidth and data rates, as compared with other known configurations. With particular regard to inertial rate sensors, the use of optical fibers eliminates many of the problems of tight alignment tolerances associated with prior art bulk-optic systems.

One limitation of conventional optical fibers in many applications is that thermal changes in an optical fiber induce changes in the effective optical path length for optical signals propagating in the fiber, principally because the refractive indexes of the core and cladding are temperature dependant. As a consequence, the accuracy of fiber optic-based instruments is strongly dependent on the temperature stability of the optical fiber.

Optical fibers have been used as the light propagating structure in laser gyroscopes (or gyro's) in both interferometer and resonant ring configurations. In such systems, a generally circular fiber optic path is established and counter-propagating coherent light beams are established in that path. Rotation of the path about its central axis establishes different length effective optical paths for each of the counter-propagating beams. In a resonant ring laser gyro, in which the optical fiber provides a multiple turn closed ring path into which the two opposite-directed beams are coupled, one or both of the beams are adjusted in phase or frequency, typically in a closed loop manner, so that the counter-propagating beams establish standing waves in the ring. The phase adjustment provides a measure of the rotation of the ring about its central axis.

In an interferometer laser gyro, oppositely directed coherent beams are coupled into opposite ends of a multi-turn fiber optic open loop path. The output beams from the open loop path are then compared to detect interference effects which establish a measure of the rotation of the multi-turn loop about its central axis.

In the various gyro configurations, the measured rate is strongly dependent on ambient temperature. For example, small changes in effective optical path length in a fiber, such as might be due to changes in physical fiber length or diameter due to temperature gradients, can cause large errors in the measured input rate. Consequently, control of environmental temperature effects is desirable.

Known methods of attempting to control temperature effects on optical fibers include passive and active techniques. One passive method is the use of thermal insulation to either thermally isolate the optical fiber from temperature variations in its environment, or to prevent the environment from experiencing a temperature change. In the former approach, the optical fiber itself typically is wrapped with insulation. In the latter, insulating material is interposed between the instrument and its enclosure.

Active approaches to temperature control include the use of a heater block or oven. Typically, the fiber optic instrument is mounted on a heater block which is generally a temperature controlled metal mass. Alternatively, an oven may be used to directly regulate the immediate ambient temperature and constitutes a heated enclosure in which the fiber optic instrument is maintained.

These known methods have not been entirely satisfactory. Insulation has the disadvantage that the thermal stability it achieves varies over time, depending upon the thickness and type of insulation and upon the rate of change, range and extremes of the ambient temperature. In addition, the significant volume of insulation generally required in many applications to maintain thermal stability may exceed desired weight or space envelope limitations. Both of the described active control methods likewise share the disadvantages of significant weight and large space envelope requirements. Additionally, power consumption considerations can severely limit the use of active control methods in airborne or spaceborne applications.

Accordingly, an object of the invention is to provide an improved optical fiber which, in use, exhibits improved thermal stability.

It is a further object of the invention to provide improved light transmission characteristics of an optical fiber by reducing adverse thermal effects, while requiring minimal additional weight and space, and consuming minimal power.

It is yet a further object of the invention to provide a fiber-optic instrument such as a gyroscope which exhibits improved temperature stability.

SUMMARY OF THE INVENTION

These and other objects of the invention are achieved by an optical fiber having a heating film disposed over its outer cladding. The terms "film" or "layer" are used interchangeably herein and refer to a relatively thin coating of a material that overlies a substrate, where the coating does not substantially effect the flexibility of the composite structure formed by the substrate and coating.

According to a first embodiment of the invention, an optical fiber comprises a cylindrical core, a generally cylindrical cladding disposed about the core, a heater for heating the cladding, and a jacket. The heater includes a heater film. Preferably, the heater film coats or covers the entire length and circumferential area of the cladding, and is bonded thereto. By way of example, the film may be a substantially uniform thickness layer of a nickel-chromium alloy deposited substantially continuously along a length of the cladding.

The invention may further include a power supply and an associated controller coupled to the heater film to drive a current through the heater film. The controller responds to the measured temperature variation of the fiber and adjusts the heater current level in a closed loop manner so that the ohmic heating produced by the current in the heating film maintains the fiber at a predetermined temperature. The temperature may be sensed by an external temperature gauge or by detection of thermally-produced aberrations in the output signal from an instrument incorporating the optical fiber.

The optical fiber may further include an electrically insulating layer disposed about the heater film and a temperature sensor interposed between the insulating layer and the jacket for providing a feedback signal indicative of temperature. The temperature sensor may include a thin film disposed substantially continuously along a length of the electrically insulating layer. Preferably, the temperature sensing film coats or covers the entire length and circumferential area of the electrically insulating layer. The temperature sensing film is bonded to the electrically insulating layer, and both that film and layer are concentric with the core and cladding.

The optical fiber according to the latter embodiment can be used in a system including a power supply connected to the heater film, and a controller connected to the thermistor film for regulating the power supply, for example, so as to produce more heat whenever the sensed temperature decreases, and less when it increases, all within an operative temperature range.

In accordance with another form of the invention, an optical fiber comprises a cylindrical core, a cylindrical cladding disposed about the core, and a thermistor film disposed substantially continuously along a length of the cladding. The thermistor film serves as a self-regulated heater when it is operating in its self-heating regime. The film may be characterized by a specific temperature/resistance characteristic such that it may function both as the sensor and heater. In this form, for example, the power supply is coupled across opposite ends of the heating film. As temperature of the fiber increases, the film resistance would rise similarly to cause a decrease in heating current. Conversely, as temperature decreases, the film resistance would similarly decrease causing an increase in heating current.

In practice, an optical fiber in accordance with the invention can be configured as a fiber loop or ring, for example, as may be used in a fiber optic gyroscope, or other instrument. The improved thermal stability of the light beam propagation through the fiber loop or ring in such configurations afforded by the invention ensures substantial improvements in gyroscope performance. Of course, the present invention may be used in other fiber optic devices in which temperature stability of optical path length is desired.

Brief DESCRIPTION of the DRAWINGS

For a fuller understanding of the features, advantages and objects of the invention, reference should be made to the following detailed description and the accompanying drawings, in which.

DETAILED DESCRIPTION OF THE EMBODIMENT

Figure 1:
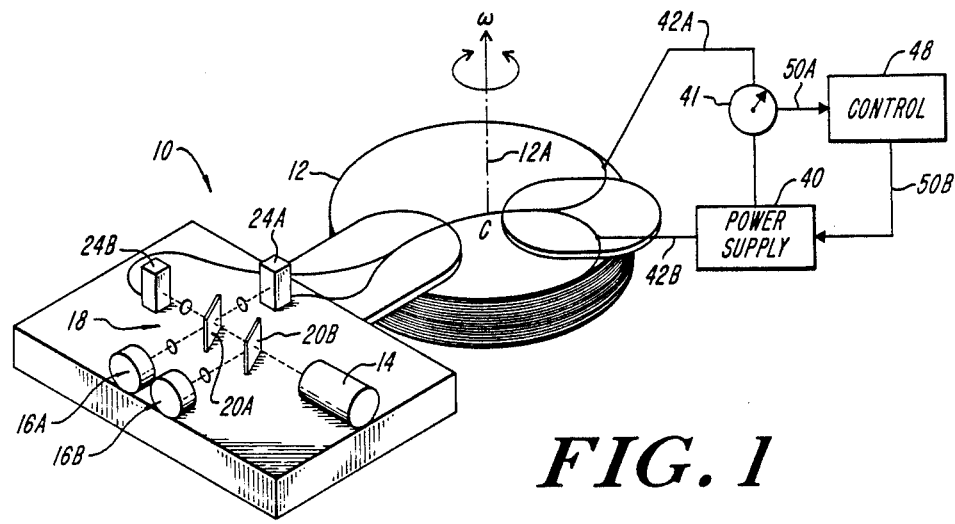
FIG. 1 is a perspective illustration of a fiber optic gyroscope employing optical fibers in accordance with the invention.

FIG. 1 shows in schematic form, an exemplary fiber-optic Sagnac interferometer gyroscope (gyro) 10 incorporating a thermally controlled optical fiber embodying the present invention.

The gyro 10 comprises a multi-turn optical fiber loop 12 of an optical fiber 30 made in accordance with this invention. Otherwise, the illustrated gyro 10 is a known configuration. By way of example, the gyro 10 may have the form shown in FIG. 1 using discrete mirrors and lens configurations. Alternatively, for example, the gyro 10 may have the form described in U.S. Pat. No. 4,563,272, assigned to the assignee of the present invention.

The optical fiber loop 12 is rotatable about its input axis 12a and connected in optical communication with a coherent light (laser) source 14 and a photodetector which includes detectors 16A and 16B. By way of example, each of detectors 16A and 16B may be a p-i-n diode detector. A coupler 18 is interposed in the light paths between the fiber loop 12 and the light source 14 and the photodetectors 16A and 16B. While in the illustrated embodiment, the coupler 18 is shown as a pair of half-silvered mirrors 20A and 20B, fiber end termination assemblies 24A and 24B, and associated focussing lens assemblies, other conventional forms of beam splitting devices may be used.

The coupler 18 serves as a beam splitter to divide the incident light beam from the light source 14 into two beams and also to apply those beams to opposite ends of the optical fiber loop 12 to establish a pair of counter propagating beams in the loop. The coupler 18 also receives the counter propagating beams as they emerge from the loop 12 and applies those received beams to a respective one of detectors 16A and 16B. The detectors 16A and 16B generate detector signals representative of the intensity of the respective incident beams. A signal processor (not shown) is responsive to these detector signals to generate in a conventional manner a rate signal representative of the input rate of the loop 12 (that is, the rate of rotation of the loop 12 about axis 12a). In alternative configurations, the counter-propagating beams may be combined after they emerge from the loop and then the resultant composite optical signal may be detected and the input rate may then be determined from the detector output in a conventional manner.

Figure 4:
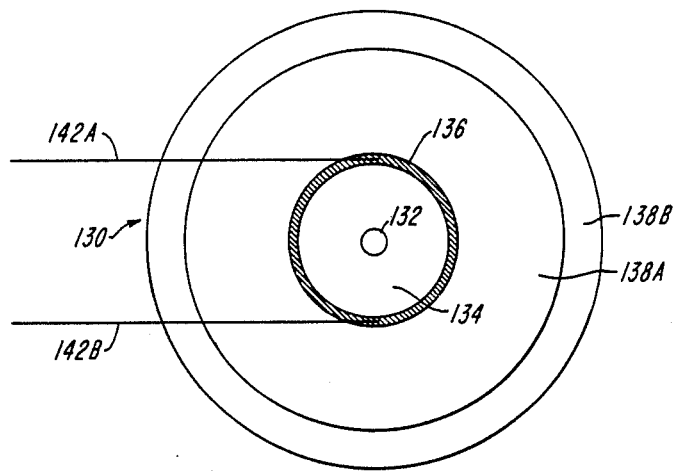
FIGS. 2, 3, and 4, inclusive, are cross-sectional views of improved optical fibers and associated control systems in accordance with alternative embodiments of the invention.
Figure 3:
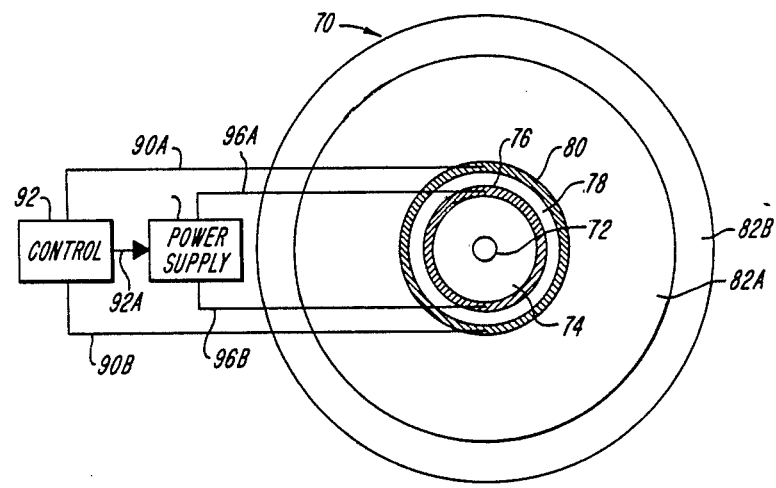
Figure 2:
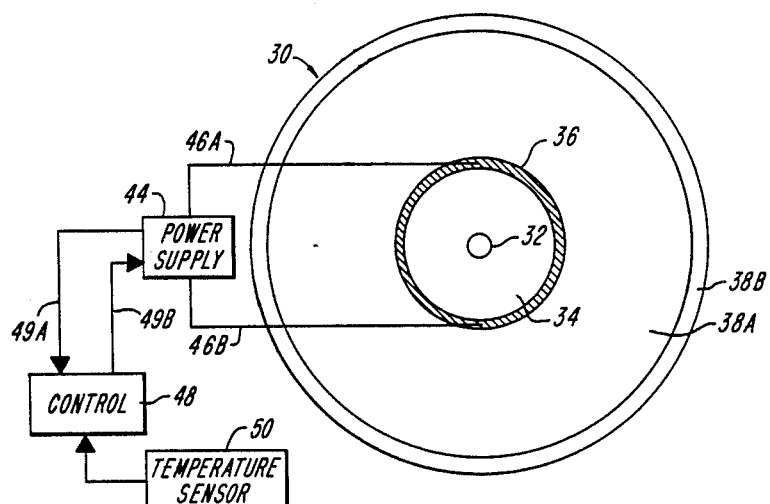

In accordance with the invention, the optical fiber 30, together with control networks described below, provide an optical path within the loop which is stable over a broad temperature range. Several embodiments of the optical fiber of the invention are shown in FIGS. 2 through 4, inclusive, and shall now be described. Such fibers might alternatively be used in otherwise conventional resonant gyro's or other fiber optic instruments.

FIG. 2 illustrates a cross section of the optical fiber 30 made in accordance with one embodiment of the invention. The embodiment of FIG. 2 is adapted for use in instruments where temperature sensing external to the optical fiber is available.

The optical fiber 30 includes a plurality of concentric layers disposed about an optically transmissive core 32. A cladding 34 is disposed about the core 32. A heater film 36 is disposed between the cladding 34 and a jacket which is shown as including a relatively soft, inner jacket 38A and a relatively hard, outer jacket 38B. The core 32, cladding 34 and jacket are all conventional elements. For a typical embodiment as shown in FIG. 2, the core is glass having a 0.0004 inch diameter and the cladding is doped glass having a 0.005 inch outer diameter. The heater film 36 is a nickel-chromium alloy, such as that sold under the trademark INCONEL, as specified in ASTM B 344, with a nominal 400 microinch thickness. The inner jacket 38A is silicon with a 0.002 inch thickness and the outer jacket 38B is acrylic with a 0.001 inch thickness.

The heater film 36 is connected to a power source 44 by busses 46A and 46B. The power source 44 is connected to controller 48 by busses 49A, 49B, which, in turn, is connected to a temperature sensor 50. The controller 48 monitors the signal from the temperature sensor 50, filtering normal or expected changes so as to yield those aberrations in the signal attributable to changes in temperature. The controller 48 then regulates the power delivered to the heater film 36 so as to compensate for and reduce the effects of those changes.

Turning now to another embodiment of the invention, FIG. 3 shows an optical fiber 70 with a feedback temperature control system employing separate temperature sensor and heater films. As before, a core 72 is surrounded concentrically by a cladding 74. About the cladding 74 is disposed a heater film 76 comprising, for example, a nominal 400 microinch thick INCONEL heating film.

An electrically insulating layer 78, preferably comprising glass or quartz, is disposed about the heater film 76 with a nominal thickness of several thousandths of an inch. The heater film 76 continuously covers a length of the cladding 74, and preferably its entire length.

A temperature sensing film 80, such as a thermistor or an alloy of iron and nickel, or platinum, overlies the insulating layer 78. The temperature sensing film 80 substantially continuously covers a length of the insulating layer 78, preferably its entire length, with a nominal thickness of 0.001 inches.

A jacket, comprising an inner, soft jacket 82A and an outer, hard jacket 82B is disposed about the sensing film 80.

This embodiment also provides temperature stabilization for the optical fiber. In an operational configuration, the sensing film 80 detects local changes in temperature, and produces a temperature signal representative of such changes. The temperature signal is applied over lines 90A and 90B to a controller 92. The controller 92 regulates a power supply 94 by means of a control signal transmitted over line 92A so as to drive a current through the heater film 76 (by means of lines 96A and 96B) to produce the ohmic heating, which heats the core 72 and cladding 74. The resultant heating of the core and cladding, in turn, influences the temperature signal as generated by the sensing film. Thus, the heater film 76 heats the cladding 72 in response to an externally generated signal. Both sensing and heating are provided within the jacket of the optical fiber 70 by integral and separate layers. In various forms of the invention, the sensing film 80 and the heater film 76 may be disposed about the core and cladding for distributive sensing and heating where and as needed. While leads 90A, 96A and leads 90B, 96B are shown as connected to diametrically opposite locations about the circumference of the optical fiber 70, it is only necessary for the locations to be spaced axially along the fiber, preferably at opposite ends of the respective films to which they are connected. For example, were the fiber loop 12 of FIG. 1 made from optical fiber 70, the lines 90A, 96A would preferably be connected at a location along the length of the fiber approximately where line 142A is shown as connected, and, similarly, lines 90B, 96B would preferably be connected at a location where line 142B is shown as connected.

FIG. 4 shows an embodiment of the invention suitable for use with the configuration of FIG. 1. In FIG. 4, an optical fiber 130 includes a core 132 with a cladding 134 disposed about that core. A thermistor film 136 is disposed between the cladding 134 and a jacket consisting of an inner jacket 138A and an outer jacket 138B.

The thermistor film 136 preferably comprises a thermistor semi-conductive material, preferably manganese oxide $Mn_3O_4$, although other metallic oxides can be used in certain applications. The film 136 coats or substantially continuously covers a length of the cladding 134, preferably the entire length of the cladding 134, over its entire circumferential area. In the present form of the invention, the thermistor film 136 serves as a spatially distributed, thermally-varying resistor characterized by a high negative temperature coefficient of resistance. In the illustrated embodiment, the thermal coefficient of resistance is approximately minus 70 ohms/degree fahrenheit/meter.

The voltage-current characteristics of typical thermistor materials are substantially linear at low voltages, but as voltage is increased, the resulting increase in current causes non-linearities due to self-heating from $i^2R$ power dissipation in the thermistor. In this range of operations, as the temperature increases, the resistance drops with increasing voltage. As a consequence, the thermistor operates as a self-heating regulator to track variations in ambient temperature and to adjust the current through that film so that the film temperature is substantially constant.

With further reference to FIG. 1, a power supply 140 and a current sensor 141 are connected in series by leads 142A, 142B to the hecter film 136 of optical fiber 130. The current sensor 141 provides a current signal representative of the current applied to maintain the desired temperature. The power supply 140 is controlled by a controller 148 that receives the current signal over bus 150A from the sensor 141 and applies a control signal over bus 150B which regulates the current applied by the power supply 140 so as to heat the optical fiber 130 sufficiently to maintain a substantially uniform or constant temperature despite fluctuating ambient conditions.

In the illustrated embodiment for the typical optical fiber, the core is glass having a 0.0004 inch diameter, the cladding 134 is doped glass having a 0.005 inch outer diameter, the film 136 has a normal thickness 0.001, the inner jacket 138A is silicon having a thickness 0.002 inches and the outer jacket 138B is acrylic having a thickness 0.001 inches. With this configuration, the thermistor film, together with an external power supply 140 (shown in FIG. 1) coupled thereto, operate to maintain the core 132 substantially at a constant temperature. The film 136 functions as both a temperature sensor and a heating element in a closed loop fashion. More particularly, as the film 136 (and core 132) rise in temperature, the film 136 responds by a change in electrical resistance. The change in electrical resistance is indicative of instantaneous or near instantaneous temperature changes, as ambient temperature varies. As the resistance changes in film 136, the ohmic heating (produced by current driven through the film by the power supply) varies in a closed loop manner to maintain the temperature at the sensor (i.e. the film 136) substantially constant.

By the use of appropriate circuitry (or program control in the case of a digital computer embodiment) in the controller 148 to control the voltage across the thermistor film 136, a time lag can be introduced in the response of the self-heating thermistor material so that it can respond to time averaged temperature changes rather than instantaneous "spike" temperature changes which may not require compensation.

All of the above-described embodiments can be seen to achieve the above stated objects of the invention, and others. The additional layers or films utilized by the invention for temperature stability, also help alleviate hydrogen absorption problems in the optical fiber and otherwise help resist deterioration and help to hermetically seal the optical fiber. Further, the temperature stability provided by the present invention is relatively good (compared with prior art temperature stabilization methods), an area of great concern in fiber optic instruments.

The invention can be embodied in other specific forms without departing from the spirit or essential characteristics thereof. The described embodiments of the invention are to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A temperature stable optical fiber, comprising:
   A. an elongated, flexible optically transmissive core and associated circumferential cladding, and
   B. means for selectively heating said core and cladding, said heating means including a resistive film disposed about and in thermal contact with the outer surface of said cladding, whereby the temperatures of said core and cladding are controlled.

2. An optical fiber according to claim 1 further comprising:
   sensor means for detecting the temperature of said core and cladding, said sensor means including a temperature sensitive film disposed about and in thermal contact with the outer surface of said cladding.

3. An optical fiber according to claims 1 or 2 wherein said heating means further includes a power supply means for selectively driving a current through said resistive film.

4. An optical fiber according to claim 2 wherein said temperature sensitive film and said resistive film are a single thermistor film, said thermistor film having a negative temperature coefficient of resistance over a predetermined range of current through said film.

5. An optical fiber according to claim 4 wherein said heating means further includes a power supply means for selectively driving a current in said predetermined range through said thermistor film.

6. An optical fiber according to claim 2 wherein said resistive film is adjacent to said cladding and wherein said resistive film and said temperature sensitive film are separated by an electrically insulating film.

7. An optical fiber according to claim 2 wherein said heating means further includes means coupled to said temperature sensitive film for generating a temperature signal representative of the temperature of said temperature sensitive film, and includes a power supply means responsive to said temperature signal for driving a current through said resistive film whereby the temperature of said core is maintained substantially constant.

* * * * *